United States Patent
Kim et al.

(10) Patent No.: US 8,611,287 B2
(45) Date of Patent: Dec. 17, 2013

(54) APPARATUS AND METHOD FOR TRANSMITTING COEXISTENCE BEACON PROTOCOL PACKET IN COGNITIVE RADIO-BASED WIRELESS COMMUNICATION SYSTEM

(75) Inventors: Sang Bum Kim, Seoul (KR); Cheng Shan, Suwon-si (KR); Eun-Taek Lim, Suwon-si (KR); Jung-Soo Woo, Suwon-si (KR); Geun-Ho Lee, Suwon-si (KR); Ho Dong Kim, Gwacheon-si (KR); Yong-Ho Park, Cheonan-si (KR)

(73) Assignee: Samsung Electronics Co., Ltd. (KR)

( * ) Notice: Subject to any disclaimer, the term of this patent is extended or adjusted under 35 U.S.C. 154(b) by 656 days.

(21) Appl. No.: 12/387,728

(22) Filed: May 7, 2009

(65) Prior Publication Data

US 2009/0279491 A1    Nov. 12, 2009

(30) Foreign Application Priority Data

May 8, 2008    (KR) .................. 10-2008-0043096

(51) Int. Cl.
*H04Q 7/00*    (2006.01)

(52) U.S. Cl.
USPC ........................................... 370/329

(58) Field of Classification Search
USPC .................. 370/328, 329, 338, 349, 401
See application file for complete search history.

(56) References Cited

U.S. PATENT DOCUMENTS

| | | | |
|---|---|---|---|
| 6,717,927 B2* | 4/2004 | Chao et al. ................... | 370/331 |
| 6,731,633 B1* | 5/2004 | Sohor et al. .................. | 370/392 |
| 6,747,959 B1* | 6/2004 | Ho ................................ | 370/282 |
| 7,031,292 B2* | 4/2006 | Laroia et al. ................. | 370/347 |
| 7,254,399 B2* | 8/2007 | Salokannel et al. ....... | 455/452.2 |
| 7,630,334 B2* | 12/2009 | Sugaya et al. ............... | 370/328 |
| 7,768,992 B2* | 8/2010 | Pun ............................... | 370/347 |
| 7,885,677 B2* | 2/2011 | Furukawa et al. ........... | 455/522 |
| 2005/0193141 A1* | 9/2005 | Jensen ......................... | 709/236 |
| 2008/0031208 A1* | 2/2008 | Abhishek et al. ............ | 370/338 |
| 2008/0212582 A1* | 9/2008 | Zwart et al. .................. | 370/390 |
| 2008/0253341 A1* | 10/2008 | Cordeiro et al. ............ | 370/338 |
| 2008/0285525 A1* | 11/2008 | Hu ............................... | 370/337 |
| 2008/0298310 A1* | 12/2008 | Hu ............................... | 370/328 |

* cited by examiner

*Primary Examiner* — Ricky Ngo
*Assistant Examiner* — Christine Ng

(57) ABSTRACT

Provided are an apparatus and a method for transmitting a CBP packet for communication information sharing between base stations in a CR-based wireless communication system. In the method, a CBP packet including a CBP identifier is transmitted to a base station of adjacent cells via one SCW slot. A CBP identifier list for successfully received CBP packets is received from the base station of the adjacent cells. When the CBP identifier is included in the CBP identifier list, the SCW slot is occupied.

26 Claims, 9 Drawing Sheets

APPARATUS AND METHOD FOR TRANSMITTING COEXISTENCE BEACON PROTOCOL PACKET IN COGNITIVE RADIO-BASED WIRELESS COMMUNICATION SYSTEM

CROSS-REFERENCE TO RELATED APPLICATION(S) AND CLAIM OF PRIORITY

The present application claims the benefit under 35 U.S.C. §119(a) of a Korean patent application filed in the Korean Intellectual Property Office on May 8, 2008 and assigned Serial No. 10-2008-0043096, the entire disclosure of which is hereby incorporated by reference.

TECHNICAL FIELD OF THE INVENTION

The present invention relates generally to a Cognitive Radio (CR)-based wireless communication system, and in particular, to an apparatus and a method for transmitting a Coexistence Beacon Protocol (CBP) packet for sharing communication information between base stations in a CR-based wireless communication system.

BACKGROUND OF THE INVENTION

With recent development of wireless communication technology, systems of various kinds that use different communication schemes coexist. For example, a system that uses a Code Division Multiple Access (CDMA) scheme called a second generation technique coexists with a system that uses an International Mobile Telecommunication (IMT)-2000 scheme, called a third generation technique, and a system that uses an Orthogonal Frequency Division Multiplexing (OFDM) scheme, called a fourth generation technique.

The coexisting systems that use different communication schemes provide a service to users using different frequency bands. However, since a frequency resource for wireless communication is limited, the frequency resource is insufficient for lots of systems to coexist.

Accordingly, a CR technique of using a frequency band or a channel that is not used temporarily among frequency bands already assigned and used is being studied. That is, even a system that is licensed for a specific frequency band does not always use all relevant frequency bands. Therefore, a CR-based wireless communication system searches for a channel that is not used temporarily by a system having a license, and then provides a service to users inside a service area through the searched channel. For example, of frequency bands assigned for transmission of TeleVison (TV) signals of 1 GHz or less, frequency bands not used temporarily can be used.

In the case where a wireless communication system applies a CR technique, base stations in charge of respective cells have to share communication information of other base stations in order to efficiently share a frequency resource. For this purpose, base stations in charge of respective cells in the CR-based wireless communication system transmit a Coexistence Beacon Protocol (referred to as "CBP" hereinafter) packet including communication information of the base stations themselves to adjacent base stations via a Self-Coexistence Window (SCW) slot, and the adjacent base stations receive the CBP packet, so that the communication information is shared. Here, the SCW slot is located at a predetermined position of every frame, and the CBP packet includes various information related to a self coexistence algorithm such as a location of a relevant base station, a sensing result, scheduling information, and a backup channel list.

As described above, in a CR-based wireless communication system, base stations share communication information regarding respective cells by transmitting and receiving a CBP packet via a SCW. However, since the SCW is a resource of a limited amount, in the case where a plurality of base stations intends to transmit CBP packets, a collision of the CBP packets occurs. When the base stations cannot normally receive a CBP packet from an adjacent base station due to collision of CBP packets, a system cannot operate swiftly. Therefore, in order to allow a CR-based wireless communication system to normally operate, an alternative for transmitting/receiving a CBP packet without collision or an error is required.

SUMMARY OF THE INVENTION

To address the above-discussed deficiencies of the prior art, it is a primary aspect of the present invention is to provide an apparatus and a method for transmitting a CBP packet in order to share communication information between base stations in a CR-based wireless communication system.

Another aspect of the present invention is to provide an apparatus and a method for avoiding collision of CBP packets transmitted between base stations in a CR-based wireless communication system.

Still another aspect of the present invention is to provide an apparatus and a method for allowing a base station to transmit ACK for a CBP packet received from a base station of an adjacent cell to the base station of the adjacent cell via a CBP packet of the base station in a CR-based wireless communication system.

Yet another aspect of the present invention is to provide an apparatus and a method for determining whether a transmitted CBP packet collides or not by allowing a base station to transmit the CBP packet to a base station of an adjacent cell, and receive ACK for the transmitted CBP packet.

According to an aspect of the present invention, a method for transmitting a Coexistence Beacon Protocol (CBP) packet of a base station in a Cognitive Radio (CR)-based system is provided. The method includes: transmitting a CBP packet including a CBP identifier to a base station of adjacent cells via one Self-Coexistence Window (SCW) slot; receiving a CBP identifier list for successfully received CBP packets from the base station of the adjacent cells; and when the CBP identifier is included in the CBP identifier list, occupying the SCW slot.

According to another aspect of the present invention, a method for transmitting, at a base station, a reply to a received CBP packet in a CR-based system is provided. The method includes: receiving a CBP packet including a CBP identifier of a relevant cell from a base station of adjacent cells for a predetermined period; decoding received CBP packets; and transmitting a CBP identifier list for successfully decoded CBP packets to the base station of the adjacent cells.

According to still another aspect of the present invention, an apparatus for transmitting, at a base station, a CBP packet in a CR-based system is provided. The apparatus includes: a controller for transmitting a CBP packet including a CBP identifier to a base station of adjacent cells via one SCW slot, receiving a CBP identifier list for successfully received CBP packets from the base station of the adjacent cells, and when the CBP identifier is included in the CBP identifier list, occupying the SCW slot; a transmitter for encoding/modulating a signal from the controller, and transmitting the encoded/modulated signal to the base station of the adjacent cells; and a receiver for demodulating/decoding a signal from the base station of the adjacent cells, and outputting the demodulated/decoded signal to the controller.

According to yet another aspect of the present invention, an apparatus for transmitting, at a base station, a reply to a received CBP packet in a CR-based system is provided. The apparatus includes: a controller for receiving a CBP packet including a CBP identifier of a relevant cell from a base station of adjacent cells for a predetermined period, and transmitting a CBP identifier list for successfully decoded CBP packets of received CBP packets to the base station of the adjacent cells; a receiver for demodulating/decoding a signal from the base station of the adjacent cells, and outputting the demodulated/decoded signal to the controller; and a transmitter for encoding/modulating a signal from the controller, and transmitting the encoded/modulated signal to the base station of the adjacent cells.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Exemplary embodiments of the present invention provide a method of transmitting a CBP packet for communication information sharing between base stations in a CR-based wireless communication system. Hereinafter, a wireless communication system using an OFDM/Orthogonal Frequency Division Multiple Access (OFDMA) scheme is illustrated by way of example. Note that exemplary embodiments of the present invention are applicable to a wireless communication system using a different scheme.

Before description of exemplary embodiments of the present invention, a SCW scheduling method for reducing collision between CBP packets in a general wireless communication system, and possibility of collision between CBP packets in the case where base stations transmit CBP packets using the SCW scheduling method are described with reference to FIGS. 1 to 3.

Figure 1:
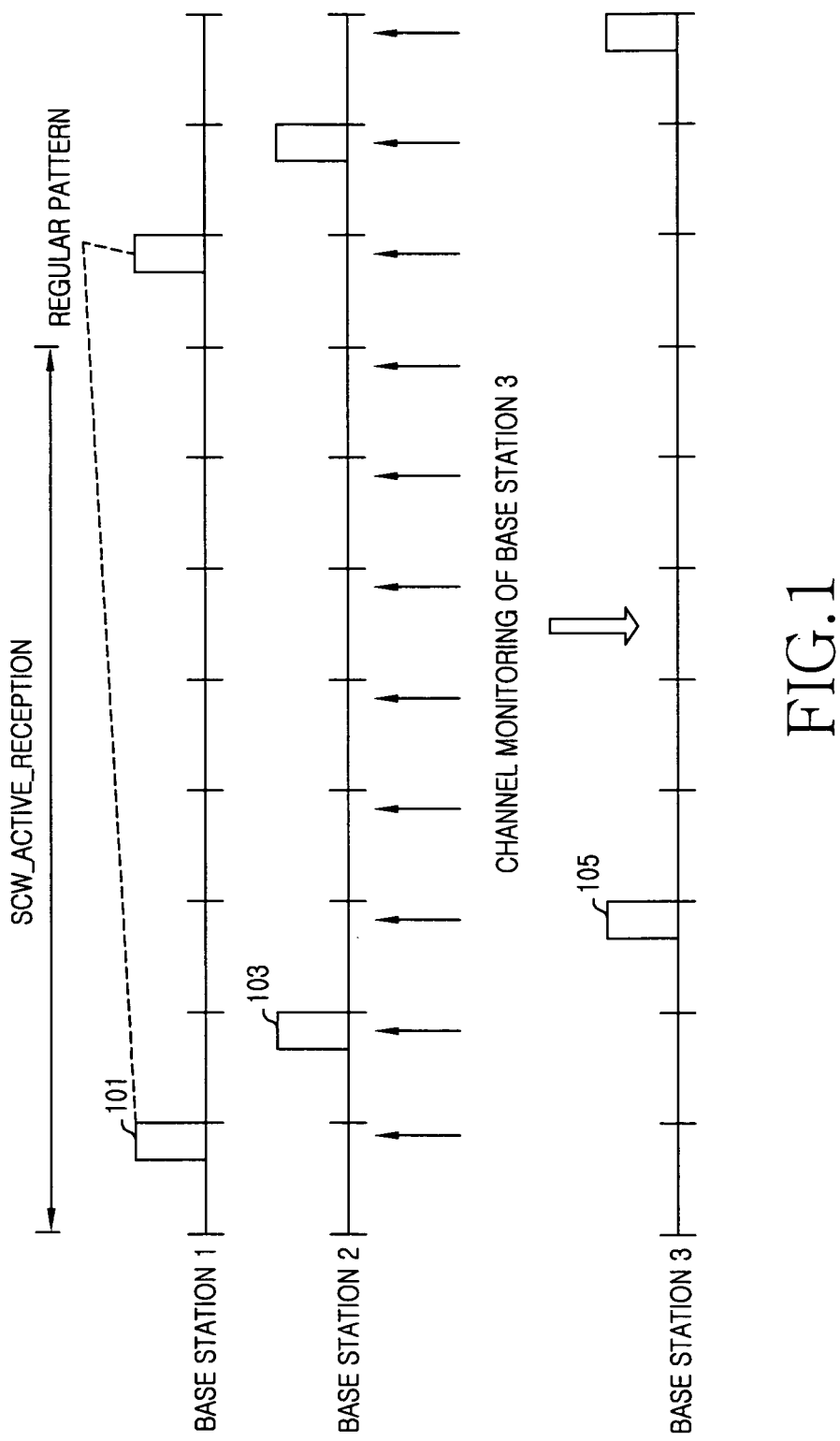
FIG. 1 is a view illustrating an example of a SCW scheduling method for reducing collision between CBP packets in a general wireless communication system.

FIG. 1 is a view illustrating an example of a SCW scheduling method for reducing collision between CBP packets in a general wireless communication system.

Referring to FIG. 1, a base station 1 and a base station 2, which use the same frequency, repeatedly transmit a CBP packet via a SCW slot occupied by each base station every predetermined period (SCW_Active_Reception). The SCW slots occupied by the base station 1 and the base station 2, respectively, are activated in a SCW slot activation period of SCW_Active_Reception. At this point, the SCW slot activation period denotes a duration including a predetermined number of successive SCW slots, for example, eight successive SCW slots. That is, the base station 1 transmits a CBP packet of the base station 1 via a first SCW slot 101 inside the SCW slot activation period, and the base station 2 transmits a CBP packet of the base station 2 via a second SCW slot 103 inside the SCW slot activation period. As described above, since the base stations 1 and 2 transmit CBP packets, respectively, via a relevant SCW slot occupied by each relevant base station in the SCW slot activation period, a CBP packet transmission pattern (hereinafter referred to as 'SCW regular pattern') is generated for each relevant base station as illustrated in FIG. 1.

In the case where a new base station 3 exists that intends to use the same frequency as that of the base station 1 and the base station 2, the new base station 3 should monitor a channel to detect SCW slots not occupied currently by other base stations, and transmit a CBP packet of the new base station 3 via one of the detected SCW slots, for example, a third SCW slot 105 inside the SCW slot activation period. This channel monitoring may reduce collision probability of a CBP packet, but is not channel monitoring at a side that receives the CBP packet. Therefore, there is still high probability that collision may occur at the reception side.

Figure 2:
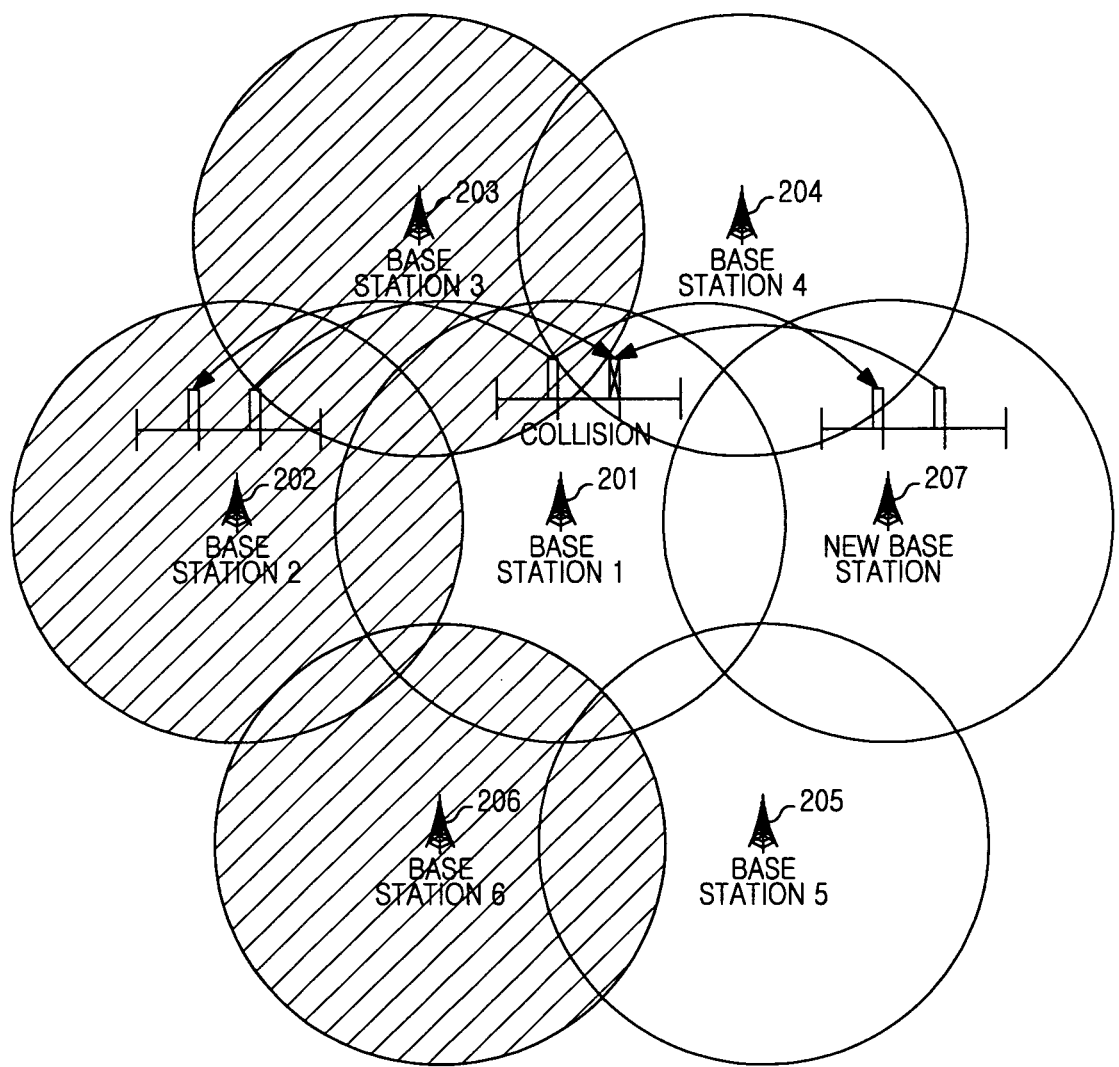
FIG. 2 is a view illustrating an example of a scenario where collision between CBP packets occurs in a general wireless communication system.

FIG. 2 is a view illustrating an example of a scenario where collision between CBP packets occurs in a general wireless communication system.

Referring to FIG. 2, under a circumstance where six cells use the same frequency and share a SCW slot in order to transmit a CBP packet and when there exists a new cell that intends to use the same frequency, a base station 207 (hereinafter referred to as 'new base station') in charge of the new cell may receive only a CBP packet transmitted by relevant base stations 201, 204, and 205 of adjacent cells of the six cells. That is, the new base station 207 may detect only SCW slots occupied by the adjacent cells and cannot detect SCW slots occupied by cells distant away (that is, a hidden node problem). Accordingly, the new base station 207 may transmit a CBP packet of the new base station itself via a SCW slot occupied by a base station 2 (202). In this case, CBP packets of the new base station 207 and the base station 2 (202) collide with each other such that the rest of the base stations 201, 203, 204, 205, and 206 cannot successfully receive CBP packets transmitted by the new base station 207 and the base station 2 (202). Such collision considerably deteriorates efficiency in a communication information sharing process between base stations.

Also, since the new base station 207 and the base station 2 (202) do not recognize such collision, the collision circumstance cannot be released fast. When a CBP packet is repeatedly transmitted every predetermined period, the collision occurs constantly. Therefore, the collision of the CBP packets needs to be informed to the new base station 207 and the base station 2 (202).

Figure 3:
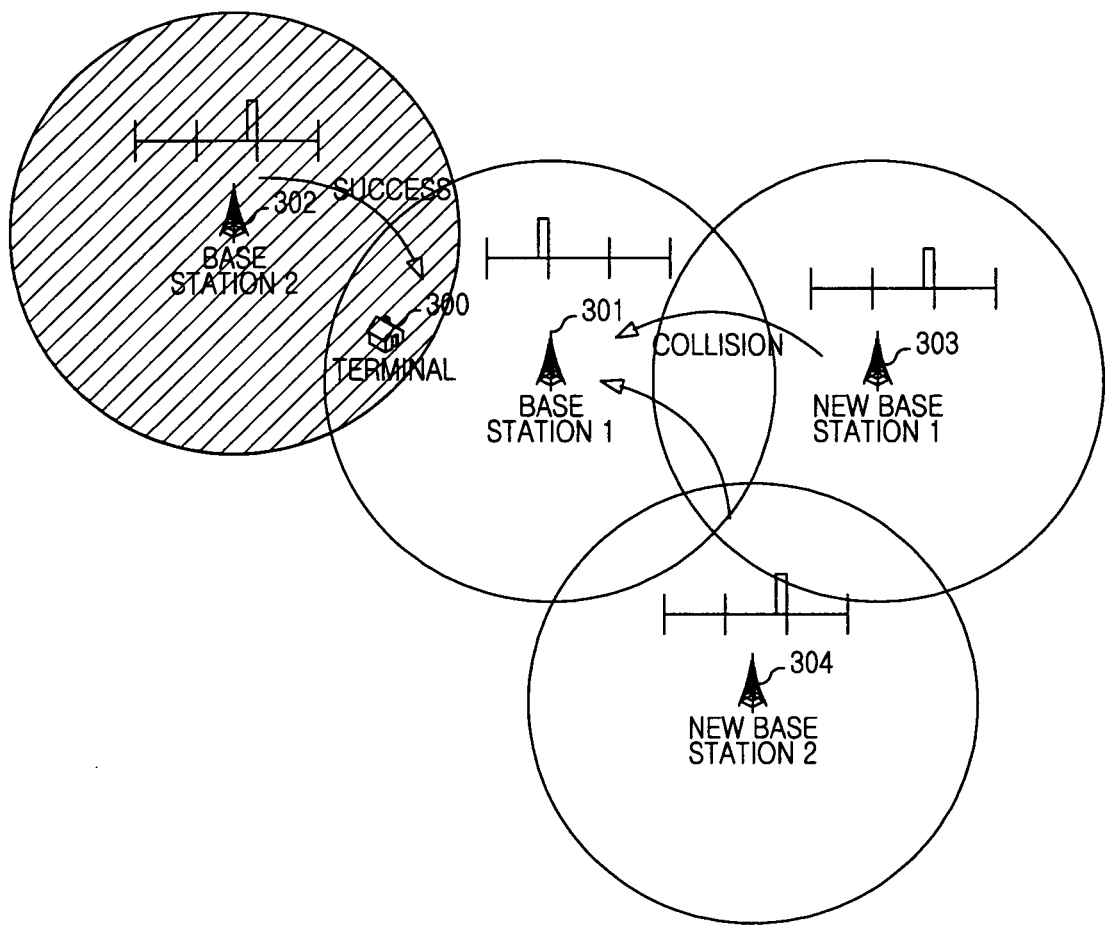
FIG. 3 is a view illustrating an example of another scenario where collision between CBP packets occurs in a general wireless communication system.

FIG. 3 is a view illustrating an example of another scenario where collision between CBP packets occurs in a general wireless communication system.

Referring to FIG. 3, a CBP packet transmitted by a relevant base station 302 of adjacent cells may be transmitted or received by a neighboring terminal 300. Therefore, even when relevant base stations 302, 303, and 304 of adjacent cells transmit a CBP packet via the same SCW slot, there may exist a successfully transmitted CBP packet in CBP packets received by a base station 1 (301). That is, each of the new base station 1 (303) and the new base station 2 (304) may transmit a CBP packet of itself via a SCW slot occupied by the base station 2 (302). In this case, the base station 1 (301) may successfully receive a CBP packet of the base station 2 (302) via the neighboring terminal 300 and may fail to receive CBP packets of the new base station 1 (303) and the new base station 2 (304). Therefore, when a base station that has received a CBP packet from a base station of an adjacent cell does not inform the base station of the adjacent cell of the successfully transmitted CBP packet together with a collision circumstance, even the base station of the adjacent cell that has succeeded in transmitting the CBP packet attempts unnecessary retransmission.

Therefore, exemplary embodiments of the present invention provide an alternative for allowing a base station to transmit ACK for a CBP packet received from a base station of an adjacent cell, allowing the base station of the adjacent cell that has received ACK to detect whether a previously transmitted CBP packet collides with the CBP, and when it is determined that collision occurs, allowing the base station of the adjacent cell to attempt retransmission of the CBP packet via an unoccupied SCW slot in a CR-based wireless communication system.

In the following description, a CBP packet includes a CBP identifier (referred to as 'CBP_ID' hereinafter). The CBP_ID includes a combination of a portion of a Media Access Control (MAC) address of a base station (for example, an 8-bit Most Significant Bit (MSB) or a 16-bit MSB) and random values (for example, 8 bits or 16 bits). The CBP_ID identifies a relevant CBP packet. The CBP_ID is newly generated whenever a base station changes a SCW slot used for transmission of a CBP packet.

Figure 4:
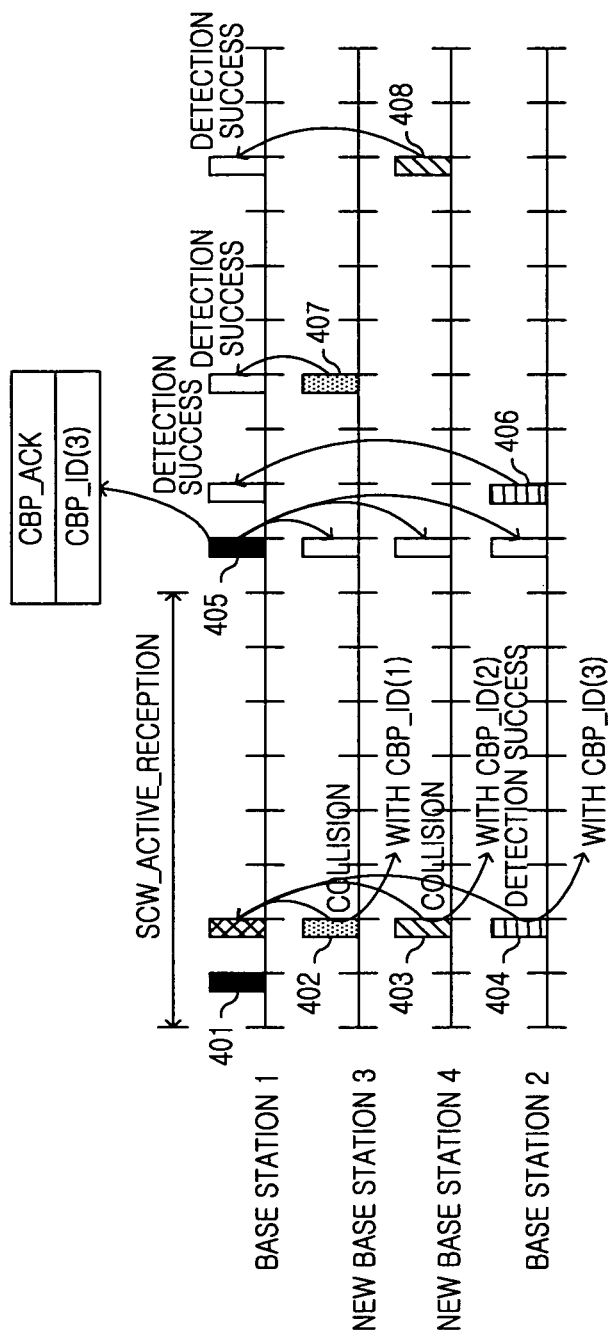
FIG. 4 is a view illustrating a method for transmitting, at a base station, ACK for a CBP packet received from an adjacent cell to the adjacent cell in a CR-based wireless communication system according to an exemplary embodiment of the present invention.

FIG. 4 is a view illustrating a method for transmitting, at a base station, ACK for a CBP packet received from an adjacent cell to the adjacent cell in a CR-based wireless communication system according to an exemplary embodiment of the present invention.

Referring to FIG. 4, a base station 1 repeatedly occupies a specific SCW slot every SCW_Active_Reception section (for example, a first SCW slot of SCW_Active_Reception section), and transmits a CBP packet 401 of the base station 1. At this point, in the case where a base station 2, a new base station 3 and a new base station 4 intend to use the frequency used by the base station 1, each of the base station 2, the new base station 3 and the new base station 4 monitors a channel, detects SCW slots not occupied currently by other base stations, selects one of the detected SCW slots, and transmits a CBP packet of itself via the selected SCW slot. Here, the CBP packet includes a CBP_ID generated by a relevant base station. At this point, when the SCW slots selected by the base station 2, the new base station 3 and the new base station 4 are the same (for example, a second SCW slot of SCW_Active_Reception section), collision between CBP packets 402 and 403 occurs, so that the base station 1 may fail to detect the CBP packets 402 and 403. At this point, a successfully detected packet may exist in CBP packets received by the base station 1. For example, a CBP packet 404 transmitted by the base station 2 may be successfully received via a neighboring terminal.

At this point, the base station 1 receives CBP packets from base stations (that is, the base station 2, the new base station 3, and the new base station 4) of adjacent cells via a SCW slot during SCW_Active_Reception section, decodes relevant CBP packets, and detects CBP_IDs of successfully received CBP packets, generates a CBP_ACK message including a CBP_ID list of the successfully received CBP packets, and transmits a CBP packet 405 including the generated CBP_ACK message to the base stations of the adjacent cells.

After that, each of the base station 2, the new base station 3, and the new base station 4 may determine whether a previously transmitted CBP packet has been successfully detected by the base station 1 through a CBP_ACK message received from the base station 1. That is, when a CBP_ID of a previously transmitted CBP packet is included in the CBP_ACK message, a base station of a relevant cell may recognize that the relevant CBP packet has been successfully transmitted, and the cell may continue to occupy a relevant SCW slot and repeatedly transmit a CBP packet of itself every SCW_Active_Reception section. For example, a CBP_ACK message of the CBP packet 405 to be transmitted by the base station 1 includes a CBP_ID of a CBP packet transmitted by the base station 2. The base station 2 that receives the CBP_ACK message may occupy a relevant SCW slot and transmit a CBP packet 406 of itself afterward. On the other hand, the new base station 3 and the new base station 4 recognize that a CBP_ID of a previously transmitted CBP packet is not included in a CBP_ACK message of the CBP packet 405 transmitted by the base station 1, and thus determines that collision has occurred. After that, the new base station 3 and the new base station 4 select a SCW slot not occupied by other base stations and attempt retransmission of CBP packets 407 and 408 including relevant CBP_IDs, respectively, in the same way.

Here, the CBP_ACK message may be configured as in Table 1.

| Syntax | Size | Notes |
|---|---|---|
| CBP_ACK IE( ){ | | |
| CBP_ID list | Variable | list of CBP_IDs transmitted successfully |
| } | | |

That is, as illustrated in Table 1, the CBP_ACK message includes a CBP_ID list of successfully received CBP packets. Here, the CBP_ACK message may be added to a CBP packet and transmitted to adjacent cells, and may be transmitted to adjacent cells through an independent message.

Figure 5A:
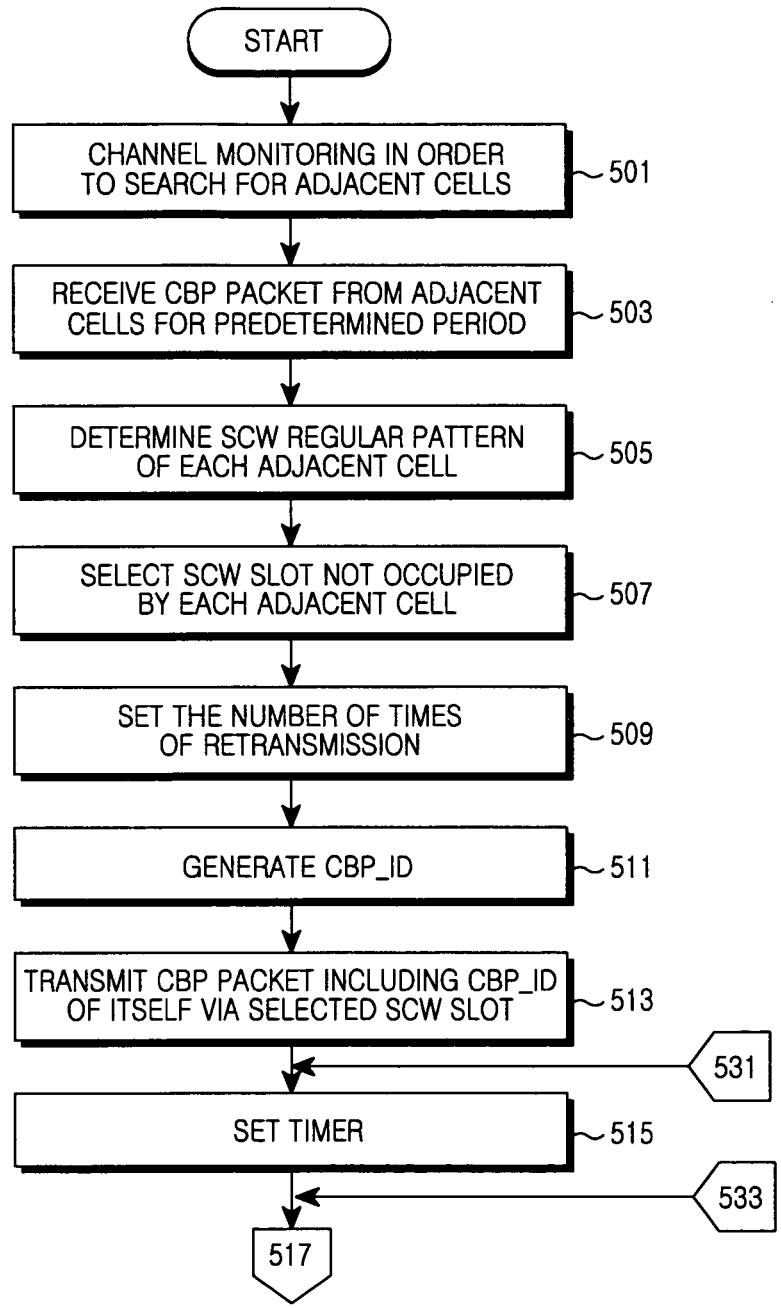
FIGS. 5A and 5B are flowcharts illustrating a method for transmitting, at a new base station, a CBP packet via an unoccupied SCW slot in a CR-based wireless communication system according to an exemplary embodiment of the present invention.
Figure 5B:
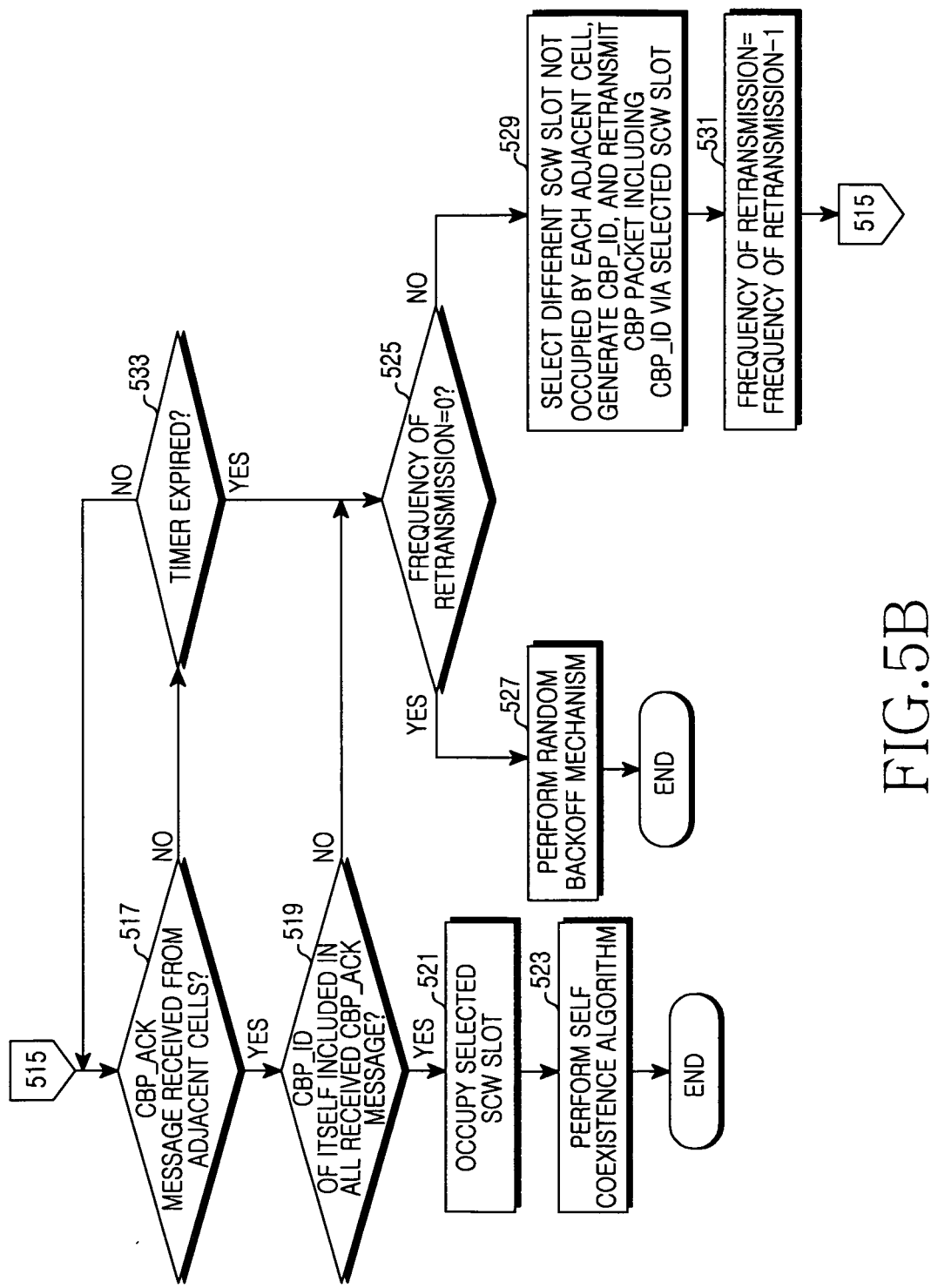

FIGS. 5A and 5B are flowcharts illustrating a method for transmitting, at a new base station, a CBP packet via an occupied SCW slot in a CR-based wireless communication system according to an exemplary embodiment of the present invention.

Referring to FIGS. 5A and 5B, in step 501, a new base station monitors a channel in order to search for adjacent cells that share a frequency to be used, and in step 503, receives CBP packets transmitted by relevant base stations of adjacent cells for a predetermined period through the channel monitoring. Here, the CBP packet includes a CBP_ID.

In step 505, the new base station recognizes a SCW regular pattern of each adjacent cell through the CBP packets of the adjacent cells received for the predetermined period.

In step 507, the new base station selects a SCW slot unoccupied by each adjacent cell using the recognized SCW regular pattern of each adjacent cell, and in step 509, sets the number of times of retransmission. Here, the number of times of retransmission is set to a value greater than zero depending on system specification.

In step 511, the new base station generates a CBP_ID of itself according to the selected SCW slot, and in step 513, transmits a CBP packet including the CBP_ID of itself to the relevant base stations of the adjacent cells via the selected SCW slot.

In step 515, the new base station sets a timer, and in step 517, determines whether a CBP_ACK message is received from the relevant base station of the adjacent cells. Here, the CBP_ACK message includes a CBP_ID list of CBP packets successfully received by the relevant base station of the adjacent cells as illustrated in Table 1.

When the CBP_ACK message is received from the relevant base station of the adjacent cells in step 517, the new base station determines whether all received CBP_ACK messages of the adjacent cells include a CBP_ID of itself (step 519). When all the received CBP_ACK messages of the adjacent cells include the CBP_ID of itself, in step 521, the new base station recognizes that a CBP packet transmitted by itself at a previous period of SCW_Active_Reception has been successfully received by the relevant base station of the adjacent cells, and occupies the selected SCW slot. In step 523, the new base station performs a self coexistence algorithm of informing the SCW slot occupied by the new base station itself to the rest of cells except the adjacent cells among the cells that use the same frequency, and then ends an algorithm according to an exemplary embodiment of the present invention.

On the other hand, when all the received CBP_ACK messages of the adjacent cells do not include the CBP_ID of itself in step 519, the new base station recognizes that collision of a CBP packet that has been transmitted at a previous period of SCW_Active_Reception has occurred, and thus the CBP packet has not been successfully received by the relevant base station of the adjacent cells, and in step 525, determines whether the set number of times of retransmission is zero in order to determine a retransmission method of the CBP packet. When the set number of times of retransmission is zero, the new base station recognizes that collision of a CBP packet of itself has occurred by the number of times of retransmission, and in step 527, performs a random backoff mechanism of retransmitting a CBP packet after a random time, and then ends the algorithm according to an exemplary embodiment of the present invention. Conversely, when the set number of times of retransmission is not zero, the new base station selects a different SCW slot not occupied by the adjacent cells on the basis of a fact that a CBP packet transmitted via the selected SCW slot has collided, generates a CBP_ID according to the selected different SCW slot, and retransmits a CBP packet including a CBP_ID of itself via the selected different SCW slot (step 529). In step 531, the new base station reduces the number of times of retransmission by 1, and goes back to step 515 to repeatedly perform subsequent steps.

Conversely, when the CBP_ACK message is not received from the relevant base station of the adjacent cells in step 517, the new base station determines whether the timer has expired in step 533. When the timer has expired, the new base station goes to step 525 and performs subsequent steps. When the timer has not expired, the new base station goes back to step 517 and repeatedly performs subsequent steps.

Figure 6:
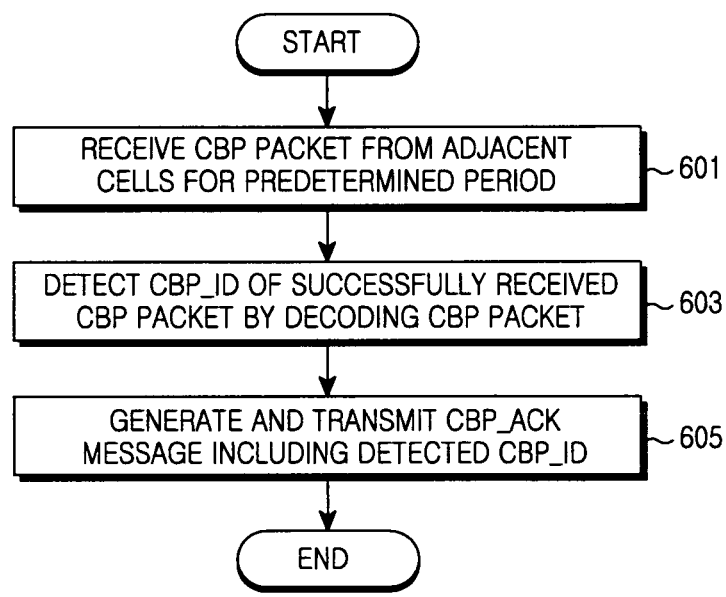
FIG. 6 is a flowchart illustrating a method for transmitting, at a base station of an adjacent cell, ACK for a CBP packet received from a base station of a neighboring different adjacent cell including a new base station to the base station of the neighboring different adjacent cell including the new base station in a CR-based wireless communication system according to an exemplary embodiment of the present invention.

FIG. 6 is a flowchart illustrating a method for transmitting, at a base station of an adjacent cell, ACK for a CBP packet received from a base station of a neighboring different adjacent cell including a new base station to the base station of the neighboring different adjacent cell including the new base station in a CR-based wireless communication system according to an exemplary embodiment of the present invention.

Referring to FIG. 6, in step 601, a base station of an adjacent cell receives a CBP packet from a base station of neighboring different adjacent cells including a new base station via a SCW slot for a predetermined period of SCW_Active_Reception section, and in step 603, detects a CBP_ID of a successfully received CBP packet by decoding the relevant CBP packet. After that, the base station of the adjacent cell generates a CBP_ACK message including a CBP_ID list of successfully received CBP packets, and transmits a CBP packet including the generated CBP_ACK message to base stations of the neighboring different adjacent cells including the new base station.

After that, the base station of the adjacent cell ends an algorithm according to an exemplary embodiment of the present invention.

According to an exemplary embodiment of the present invention, a base station of an adjacent cell may generate a CBP_ACK message including position information of an occupied SCW slot together with a CBP_ID list, and transmit a CBP packet including the generated CBP_ACK message in order to transmit a CBP packet more efficiently. In this case, a new base station that has received the CBP_ACK message may avoid an already occupied SCW slot and transmit a CBP packet of itself using the position information of the occupied SCW slot. That is, the new base station may determine whether a CBP packet transmitted via an occupied SCW slot at a previous period has been successfully transmitted through the CBP_ID list by receiving the CBP_ACK message for the CBP packet transmitted by itself at the previous period of SCW_Active_Reception. Also, when it is determined that collision has occurred through the above-described process, the new base station may search for a different unoccupied SCW slot more accurately through the position information of the occupied SCW slot, and transmit a CBP packet of itself via the searched SCW slot again. This method may search for an unoccupied SCW slot more accurately than a method of searching for a SCW slot using only a channel monitoring result. Also, this method has an advantage of detecting CBP packet transmission positions of hidden nodes that cannot be resolved by channel monitoring. To use this method, recognition addresses of respective SCW slots that may be known to all adjacent cells are required.

Figure 7:
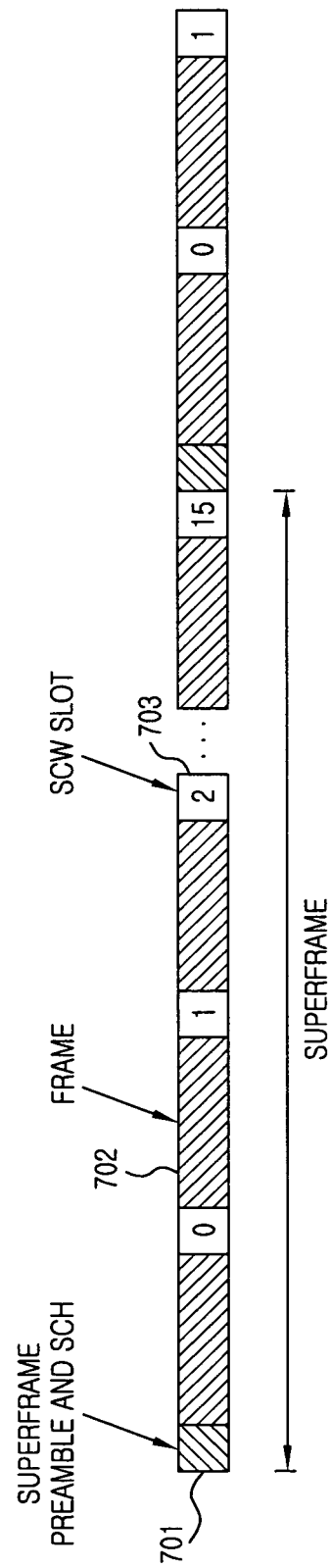
FIG. 7 is a view illustrating a super frame structure to which a SCW slot has been assigned according to an exemplary embodiment of the present invention.

Here, a superframe structure in which a SCW slot has been assigned according to an exemplary embodiment of the present invention is described with reference to FIG. 7. A superframe includes a superframe preamble and a Synchronization CHannel (SCH) 701, and one or more frames 702. There is a SCW slot 703 at the end of each frame 702. Here, each SCW slot 703 has an address called SCW_Number. SCW_Number has a module value of a relevant frame. For example, assuming that a total number of frames inside a superframe is '16', SCW_Number has a value ranging from '0' to '15'. Each SCW slot 703 is given SCW_Number that increases by one (1) in a time order. When SCW_Number exceeds '15', numbering starts from '0' again. Here, since adjacent cells should be synchronized with respect to the superframe, SCW slot position recognition information does not need to be shared separately.

In this case, the CBP_ACK message can be configured as in Table 2.

| Syntax | Size | Notes |
|---|---|---|
| CBP_ACK IE( ){ | | |
| MAX_SCW_slot_number | | Maximum of SCW_Number |
| For(i=0;i<MAX_SCW_slot_number ;i++){ | | |
| CBP_ID list | Variable | list of CBP_IDs transmitted successfully at each SCW slot |
| } | | |
| } | | |

Here, MAX_SCW_slot_number denotes largest SCW_Number of SCW_Number given to each slot.

Figure 8:
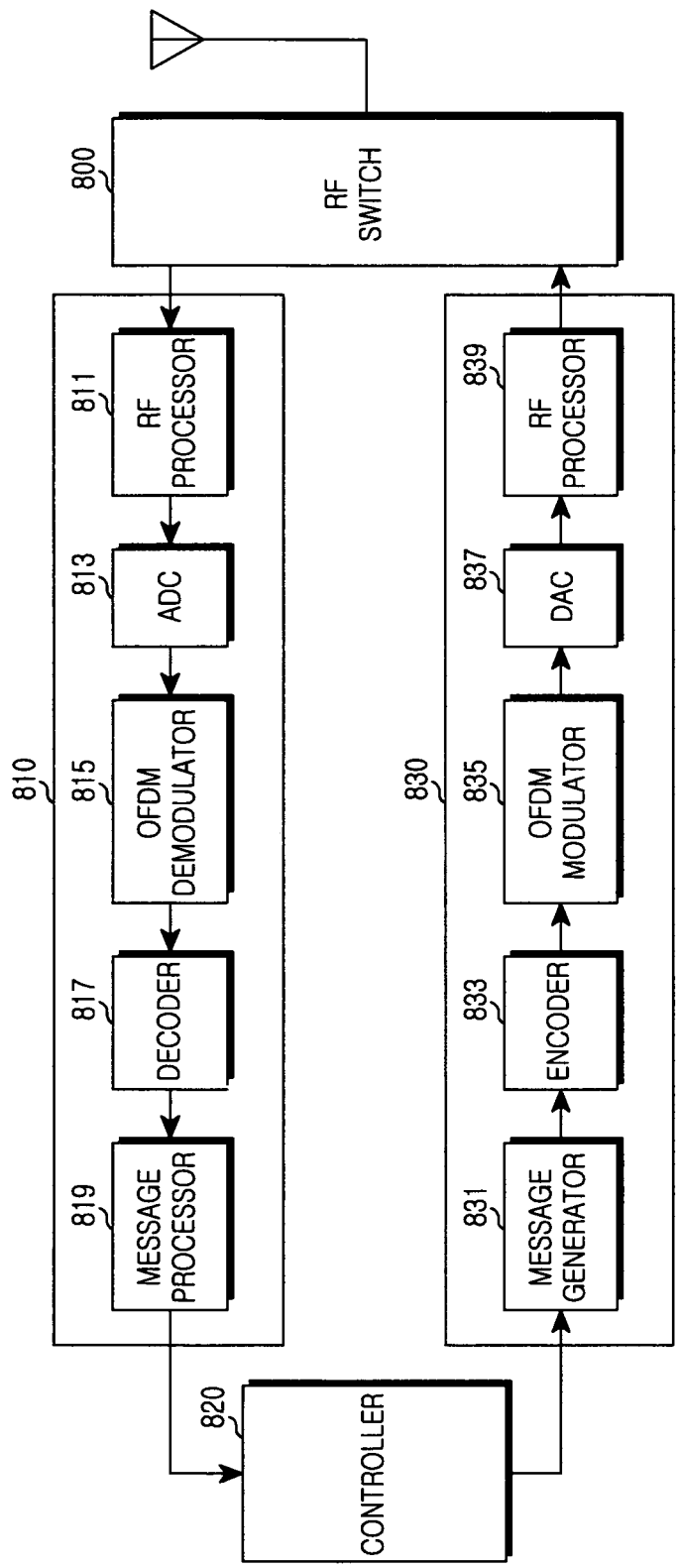
FIG. 8 is a block diagram illustrating a base station in a CR-based wireless communication system according to an exemplary embodiment of the present invention.

FIG. 8 is a block diagram illustrating a base station in a CR-based wireless communication system according to an exemplary embodiment of the present invention. Here, since a basic structure of a new base station is similar to that of a base station of an adjacent cell, both the new base station and the base station of the adjacent cell are described using the construction of a base station illustrated in FIG. 8.

As illustrated in FIG. 8, the base station includes a Radio Frequency (RF) switch 800, a receiver 810, a controller 820, and a transmitter 830.

Referring to FIG. 8, the RF switch 800 connects an antenna with the receiver 810 during a section that receives a signal, and connects the antenna with the transmitter 830 during a section that transmits a signal.

The receiver 810 includes an RF processor 811, an Analog/Digital Converter (ADC) 813, an OFDM demodulator 815, a decoder 817, and a message processor 819.

The RF processor 811 converts an RF signal input from the RF switch 800 to a baseband analog signal. The ADC 813 converts an analog signal provided from the RF processor 811 to sample data. The OFDM demodulator 815 converts sample data in a time domain provided from the ADC 813 to data in a frequency domain by performing Fourier Transform.

The decoder 817 selects data of subcarriers to be actually received from data in the frequency domain provided from the OFDM demodulator 815, and demodulates and decodes the selected data according to a predetermined Modulation and Coding Scheme (MCS) level.

The message processor 819 decomposes a message provided from the decoder 817, and provides a result thereof to the controller 820. For example, the message processor 819 provides CBP packets received from adjacent cells to the controller 820.

The controller 820 controls an overall operation in order to perform a CR function of a base station. For example, the controller 820 performs an operation for transmitting a CBP_ACK message for a CBP packet received from a base station of adjacent cells for a predetermined period to the base station of the adjacent cells through a CBP packet of itself. Also, the controller 820 transmits a CBP packet including a CBP_ID of itself to the base station of the adjacent cells, and determines whether the transmitted CBP packet collides by receiving a CBP_ACK message thereof, and when it is determined that the collision has occurred, performs an operation for attempting retransmission of a CBP packet via an unoccupied SCW slot.

The transmitter 830 includes a message generator 831, an encoder 833, an OFMD modulator 835, a Digital/Analog Converter (DAC) 837, and an RF processor 839.

The message generator 831 generates a CBP packet including a CBP_ID or a CBP_ACK message according to a control of the controller 820.

The encoder 833 encodes and modulates a message provided from the message generator 831 according to a relevant MCS level. The OFDM modulator 835 converts data in the frequency domain provided from the encoder 833 to sample data (OFDM symbol) in the time domain by performing Inverse Fourier Transform.

The DAC 837 converts the sample data provided from the OFDM modulator 835 to an analog signal. The RF processor 839 converts an analog signal provided from the DAC 837 to an RF signal of a relevant channel.

As described above, according to an exemplary embodiment of the present invention, a base station in a CR-based wireless communication system transmits ACK for a CBP packet received from a base station of an adjacent cell to the base station of the adjacent cell through a CBP packet of itself, and the base station of the adjacent cell that receives ACK recognizes whether the previously transmitted CBP packet collides, and when it is determined that the collision has occurred, the base station of the adjacent cell attempts retransmission of the CBP packet via an unoccupied SCW slot. Therefore, the base station that has transmitted the CBP packet may determine whether the CBP packet transmitted by itself has been successfully transmitted without collision, and reduce collision probability of a CBP packet by releasing the collision circumstance fast, and reduce the number of times of retransmission after the collision of the CBP packet.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for transmitting a Coexistence Beacon Protocol (CBP) packet of a specified base station in a Cognitive Radio (CR)-based system, wherein the specified base station is in a specified cell, the method comprising:
    determining a Self-Coexistence Window (SCW) slot occupied by each of one or more adjacent base stations by receiving a CBP packet from each of the adjacent base stations for a predetermined period, wherein each of the adjacent base stations is in a cell adjacent to the specified cell;
    selecting by the specified base station a SCW slot not occupied by an adjacent base station as the SCW slot for transmitting a CBP packet from the specified base station, wherein the CBP packet comprises a CBP identifier that identifies the CBP packet;
    transmitting the CBP packet to the adjacent base stations through the selected SCW slot;
    receiving a CBP identifier list for successfully received CBP packets from each of the adjacent base stations; and
    when the CBP identifier is included in the CBP identifier list received from each of the adjacent base stations, occupying the selected SCW slot.

2. The method of claim 1, wherein the CBP identifier comprises a Media Access Control (MAC) address generated based on a combination of a portion of a MAC address of the specified base station and random values.

3. The method of claim 1, further comprising generating the CBP identifier based on the selected SCW slot.

4. The method of claim 1, further comprising, when the CBP identifier is not included in the CBP identifier list, retransmitting the CBP packet based on a set number of times of retransmission.

5. The method of claim 4, wherein the retransmitting of the CBP packet comprises:
    selecting a different SCW slot not occupied by an adjacent base station as the SCW slot for transmitting the CBP packet;
    generating a CBP identifier based on the selected different SCW slot; and
    transmitting a CBP packet comprising the generated CBP identifier to the adjacent base stations through the selected different SCW slot.

6. The method of claim 4, further comprising, when the SCW slot is not occupied after the retransmitting of the CBP packet for the set number of times of retransmission, retransmitting the CBP packet after a random time.

7. The method of claim 1, wherein the receiving the CBP identifier list comprises receiving the CBP packet comprising the CBP identifier list from each adjacent base station.

8. The method of claim 7, wherein the CBP packet received from a first adjacent base station further comprises position information of the SCW slot occupied by a second adjacent base station of a different adjacent cell.

9. The method of claim 8, further comprising:
    when the CBP identifier is not included in the CBP identifier list, selecting a different SCW slot not occupied by an adjacent base station as the SCW slot for transmitting the CBP packet by using the position information of the SCW slot occupied by the second adjacent base station of the different adjacent cell;
    generating the CBP identifier based on the selected different SCW slot; and
    retransmitting the CBP packet comprising the generated CBP identifier to the adjacent base stations through the selected different SCW slot.

10. A method for transmitting, at a specified base station, a reply to a received Coexistence Beacon Protocol (CBP) packet in a Cognitive Radio (CR)-based system, wherein the specified base station is in a specified cell, the method comprising:
    receiving a CBP packet comprising a CBP identifier from a first adjacent base station through a Self-Coexistence Window (SCW) slot selected by the first adjacent base station for a predetermined period, wherein the SCW slot is selected by the first adjacent base station as not being occupied by the specified base station and as the SCW slot for transmitting a CBP packet from the first adjacent base station, wherein the first adjacent base station is in a cell adjacent to the specified cell, and wherein the CBP identifier identifies the CBP packet;
    decoding received CBP packets; and
    transmitting a CBP identifier list for successfully decoded CBP packets to the first adjacent base station.

11. The method of claim 10, wherein the CBP identifier comprises a Media Access Control (MAC) address generated based on a combination of a portion of a MAC address of the first adjacent base station and random values.

12. The method of claim 10, further comprising generating the CBP packet comprising the CBP identifier list, wherein the transmitting the CBP identifier list comprises transmitting the generated CBP packet.

13. The method of claim 12, wherein the generated CBP packet further comprises position information of the SCW slot occupied by a second adjacent base station of a different adjacent cell.

14. An apparatus for transmitting, at a specified base station, a Coexistence Beacon Protocol (CBP) packet in a Cognitive Radio (CR)-based system, wherein the specified base station is in a specified cell, the apparatus comprising:
    a controller configured to determine a Self-Coexistence Window (SCW) slot occupied by each of one or more adjacent base stations by receiving a CBP packet from each of the adjacent base stations for a predetermined period, wherein each of the adjacent base stations is in a cell adjacent to the specified cell, to select a SCW slot not occupied by an adjacent base station as the SCW slot for transmitting the CBP packet from the specified base station, wherein the CBP packet comprises a CBP identifier that identifies the CBP packet, to transmit the CBP packet to the adjacent base stations through the selected SCW slot, to receive a CBP identifier list for successfully received CBP packets from each of the adjacent base stations, and when the CBP identifier is included in the CBP identifier list received from each of the adjacent base stations, to occupy the selected SCW slot;
    a transmitter configured to encode and modulate a signal from the controller and to transmit the encoded/modulated signal to the adjacent base stations; and
    a receiver configured to demodulate and decode signals from the adjacent base stations and to output the demodulated/decoded signals to the controller.

15. The apparatus of claim 14, wherein the CBP identifier comprises a Media Access Control (MAC) address generated based on a combination of a portion of a MAC address of the specified base station and random values.

16. The apparatus of claim 14, wherein the controller is further configured to generate the CBP identifier based on the selected SCW slot.

17. The apparatus of claim 14, wherein when the CBP identifier is not included in the CBP identifier list, the controller is further configured to retransmit the CBP packet based on a set number of times of retransmission.

18. The apparatus of claim 17, wherein the controller is configured to retransmit the CBP packet by selecting a different SCW slot not occupied by an adjacent base station as the SCW slot for transmitting the CBP packet, generating the CBP identifier based on the selected different SCW slot, and transmitting the CBP packet comprising the generated CBP identifier to the adjacent base stations through the selected different SCW slot.

19. The apparatus of claim 17, wherein when the SCW slot is not occupied after the retransmitting of the CBP packet for the set number of times of retransmission, the controller is further configured to retransmit the CBP packet after a random time.

20. The apparatus of claim 14, wherein the CBP identifier list is included in the CBP packet transmitted by each of the adjacent base stations.

21. The apparatus of claim 20, wherein the CBP packet transmitted by a first one of the adjacent base stations comprises position information of the SCW slot occupied by a second one of the adjacent base stations.

22. The apparatus of claim 21, wherein when the CBP identifier is not included in the CBP identifier list, the controller is further configured to select a different SCW slot not occupied by an adjacent base station as the SCW slot for transmitting the CBP packet by using the position information of the SCW slot occupied by the second one of the adjacent base stations, to generate the CBP identifier based on the selected different SCW slot, and to retransmit a CBP packet comprising the generated CBP identifier to the adjacent base stations through the selected different SCW slot.

23. An apparatus for transmitting, at a specified base station, a reply to a received Coexistence Beacon Protocol (CBP) packet in a Cognitive Radio (CR)-based system, wherein the specified base station is in a specified cell, the apparatus comprising:
    a controller configured to receive a CBP packet comprising a CBP identifier from a first adjacent base station through a Self-Coexistence Window (SCW) slot selected by the first adjacent base station for a predetermined period and to transmit a CBP identifier list for successfully decoded CBP packets to the first adjacent base station, wherein the SCW slot is selected by the first adjacent base station as not being occupied by the specified base station and as the SCW slot for transmitting a CBP packet from the first adjacent base station, wherein the first adjacent base station is in a cell adjacent to the specified cell, and wherein the CBP identifier identifies the CBP packet;
    a receiver configured to demodulate and decode a signal from the first adjacent base station and to output the demodulated/decoded signal to the controller; and
    a transmitter configured to encode and modulate a signal from the controller and to transmit the encoded/modulated signal to the first adjacent base station.

24. The apparatus of claim 23, wherein the CBP identifier comprises a Media Access Control (MAC) address generated based on a combination of a portion of a MAC address of the first adjacent base station and random values.

25. The apparatus of claim 23, wherein the CBP packet transmitted by the specified base station comprises the CBP identifier list.

26. The apparatus of claim 25, wherein the CBP packet transmitted by the specified base station further comprises position information of the SCW slot occupied by a second adjacent base station of a different adjacent cell.

* * * * *